United States Patent
Kato (10) Patent No.: US 8,179,329 B2
(45) Date of Patent: May 15, 2012

(54) COMPOSITE ANTENNA

(75) Inventor: Noboru Kato, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 5 days.

(21) Appl. No.: 12/845,846

(22) Filed: Jul. 29, 2010

(65) Prior Publication Data

US 2010/0283694 A1    Nov. 11, 2010

Related U.S. Application Data (63) Continuation of application No. PCT/JP2009/053693, filed on Feb. 27, 2009.

(30) Foreign Application Priority Data

Mar. 3, 2008   (JP) ................................ 2008-052145
Nov. 25, 2008  (JP) ................................ 2008-299780

(51) Int. Cl.
*H01Q 21/00*   (2006.01)
(52) U.S. Cl. ....................................... 343/726; 343/730
(58) Field of Classification Search .......... 343/725–730, 343/700 MS; 340/572.1, 572.7
See application file for complete search history.

(56) References Cited

U.S. PATENT DOCUMENTS

| | | |
|---|---|---|
| 3,364,564 A | 1/1968 | Kurtz et al. |
| 4,794,397 A | 12/1988 | Ohe et al. |
| 5,198,826 A * | 3/1993 | Ito ................................. 343/726 |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |

(Continued)

FOREIGN PATENT DOCUMENTS

DE    10 2006 057 369 A1    6/2008

(Continued)

OTHER PUBLICATIONS

Official Communication issued in International Patent Application No. PCT/JP2008/063025, mailed on Aug. 12, 2008.

(Continued)

*Primary Examiner* — Hoang V Nguyen
(74) *Attorney, Agent, or Firm* — Keating & Bennett, LLP (57) ABSTRACT

A composite antenna achieves favorable radiation characteristics and favorable communication performance, and can be used in short distance communication as well as long distance communication. The composite antenna includes a dipole antenna having an elongated shape, a loop antenna including at least one pair of opposing end portions, and a connection portion arranged to connect the dipole antenna and a point of the loop antenna at which the amplitude of a current flowing in the loop antenna has a maximum value. The dipole antenna performs long distance communication utilizing an electric field, and the loop antenna performs short distance communication utilizing a magnetic field. This composite antenna may be used as a wireless IC device in RFID systems.

13 Claims, 5 Drawing Sheets

U.S. PATENT DOCUMENTS

| | | | |
|---|---|---|---|
| 6,107,920 A | 8/2000 | Eberhardt et al. | |
| 6,172,608 B1 | 1/2001 | Cole | |
| 6,181,287 B1 | 1/2001 | Beigel | |
| 6,190,942 B1 | 2/2001 | Wilm et al. | |
| 6,249,258 B1 | 6/2001 | Bloch et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,812,707 B2 | 11/2004 | Yonezawa et al. | |
| 6,828,881 B2 | 12/2004 | Mizutani et al. | |
| 6,837,438 B1 | 1/2005 | Takasugi et al. | |
| 6,861,731 B2 | 3/2005 | Buijsman et al. | |
| 6,927,738 B2 | 8/2005 | Senba et al. | |
| 6,963,729 B2 | 11/2005 | Uozumi | |
| 7,088,249 B2 | 8/2006 | Senba et al. | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,277,017 B2 * | 10/2007 | Baba et al. | 340/572.7 |
| 7,317,396 B2 | 1/2008 | Ujino | |
| 7,405,664 B2 | 7/2008 | Sakama et al. | |
| 2002/0011967 A1 | 1/2002 | Goff et al. | |
| 2002/0015002 A1 | 2/2002 | Yasukawa et al. | |
| 2002/0044092 A1 | 4/2002 | Kushihi | |
| 2002/0067316 A1 | 6/2002 | Yokoshima et al. | |
| 2002/0093457 A1 | 7/2002 | Hamada et al. | |
| 2003/0006901 A1 | 1/2003 | Kim et al. | |
| 2003/0020661 A1 | 1/2003 | Sato | |
| 2003/0045324 A1 | 3/2003 | Nagumo et al. | |
| 2003/0169153 A1 | 9/2003 | Muller | |
| 2004/0001027 A1 | 1/2004 | Killen et al. | |
| 2004/0026519 A1 | 2/2004 | Usami et al. | |
| 2004/0056823 A1 | 3/2004 | Zuk et al. | |
| 2004/0066617 A1 | 4/2004 | Hirabayashi et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2004/0252064 A1 | 12/2004 | Yuanzhu | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0134460 A1 | 6/2005 | Usami | |
| 2005/0134506 A1 | 6/2005 | Egbert | |
| 2005/0138798 A1 | 6/2005 | Sakama et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0044192 A1 | 3/2006 | Egbert | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0214801 A1 | 9/2006 | Murofushi et al. | |
| 2006/0220871 A1 | 10/2006 | Baba et al. | |
| 2006/0244676 A1 | 11/2006 | Uesaka | |
| 2006/0267138 A1 | 11/2006 | Kobayashi | |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0057854 A1 | 3/2007 | Oodachi et al. | |
| 2007/0069037 A1 | 3/2007 | Kawai | |
| 2007/0132591 A1 | 6/2007 | Khatri | |
| 2007/0164414 A1 | 7/2007 | Dokai et al. | |
| 2007/0252700 A1 | 11/2007 | Ishihara et al. | |
| 2007/0252703 A1 | 11/2007 | Kato et al. | |
| 2007/0285335 A1 | 12/2007 | Bungo et al. | |
| 2008/0024156 A1 | 1/2008 | Arai et al. | |
| 2008/0087990 A1 | 4/2008 | Kato et al. | |
| 2008/0150719 A1 * | 6/2008 | Cote et al. | 340/572.1 |
| 2008/0169905 A1 | 7/2008 | Slatter | |
| 2008/0272885 A1 | 11/2008 | Atherton | |
| 2009/0002130 A1 | 1/2009 | Kato | |
| 2009/0009007 A1 | 1/2009 | Kato et al. | |
| 2009/0065594 A1 | 3/2009 | Kato et al. | |
| 2009/0096696 A1 * | 4/2009 | Joyce et al. | 343/793 |
| 2009/0109102 A1 | 4/2009 | Dokai et al. | |

FOREIGN PATENT DOCUMENTS

| | | |
|---|---|---|
| EP | 0 694 874 A2 | 1/1996 |
| EP | 0 977 145 A2 | 2/2000 |
| EP | 1 010 543 A1 | 6/2000 |
| EP | 1 160 915 A2 | 12/2001 |
| EP | 1 170 795 A2 | 1/2002 |
| EP | 1 227 540 A1 | 7/2002 |
| EP | 1 280 232 A1 | 1/2003 |
| EP | 1 343 223 A1 | 9/2003 |
| EP | 1 357 511 A2 | 10/2003 |
| EP | 1 548 872 A1 | 6/2005 |
| EP | 1 703 589 A1 | 9/2006 |
| JP | 50-143451 A | 11/1975 |
| JP | 62-127140 U | 8/1987 |
| JP | 02-164105 A | 6/1990 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-056113 A | 2/1996 |
| JP | 8-87580 A | 4/1996 |
| JP | 08-088586 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-193849 A | 7/1998 |
| JP | 10-293828 A | 11/1998 |
| JP | 11-039441 A | 2/1999 |
| JP | 11-075329 A | 3/1999 |
| JP | 11-085937 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |

| | | | | | | |
|---|---|---|---|---|---|---|
| JP | 2005-229474 A | 1/2000 | | JP | 2003-078336 A | 3/2003 |
| JP | 2000-059260 A | 2/2000 | | JP | 2003-085501 A | 3/2003 |
| JP | 2000-085283 A | 3/2000 | | JP | 2003-085520 A | 3/2003 |
| JP | 2000-090207 A | 3/2000 | | JP | 2003-87008 A | 3/2003 |
| JP | 2000-132643 A | 5/2000 | | JP | 2003-87044 A | 3/2003 |
| JP | 2000-137778 A | 5/2000 | | JP | 2003-099720 A | 4/2003 |
| JP | 2000-137779 A | 5/2000 | | JP | 2003-099721 A | 4/2003 |
| JP | 2000-137785 A | 5/2000 | | JP | 2003-110344 A | 4/2003 |
| JP | 2000-148948 A | 5/2000 | | JP | 2003-132330 A | 5/2003 |
| JP | 2000-172812 A | 6/2000 | | JP | 2003-134007 A | 5/2003 |
| JP | 2000-209013 A | 7/2000 | | JP | 2003-155062 A | 5/2003 |
| JP | 2000-222540 A | 8/2000 | | JP | 2003-158414 A | 5/2003 |
| JP | 2000-510271 A | 8/2000 | | JP | 2003-187207 A | 7/2003 |
| JP | 2000-243797 A | 9/2000 | | JP | 2003-187211 A | 7/2003 |
| JP | 2000-251049 A | 9/2000 | | JP | 2003-188338 A | 7/2003 |
| JP | 2000-276569 A | 10/2000 | | JP | 2003-188620 A | 7/2003 |
| JP | 2000-286634 A | 10/2000 | | JP | 2003-198230 A | 7/2003 |
| JP | 2000-286760 A | 10/2000 | | JP | 2003-209421 A | 7/2003 |
| JP | 2000-311226 A | 11/2000 | | JP | 2003-216919 A | 7/2003 |
| JP | 2000-321984 A | 11/2000 | | JP | 2003-218624 A | 7/2003 |
| JP | 3075400 U | 11/2000 | | JP | 2003-233780 A | 8/2003 |
| JP | 2000-349680 A | 12/2000 | | JP | 2003-242471 A | 8/2003 |
| JP | 2001-028036 A | 1/2001 | | JP | 2003-243918 A | 8/2003 |
| JP | 2007-18067 A | 1/2001 | | JP | 2003-249813 A | 9/2003 |
| JP | 2001-043340 A | 2/2001 | | JP | 2003-529163 A | 9/2003 |
| JP | 2001-66990 A | 3/2001 | | JP | 2003-288560 A | 10/2003 |
| JP | 2001-505682 A | 4/2001 | | JP | 2003-309418 A | 10/2003 |
| JP | 2001-168628 A | 6/2001 | | JP | 2003-317060 A | 11/2003 |
| JP | 2001-188890 A | 7/2001 | | JP | 2003-331246 A | 11/2003 |
| JP | 2001-240046 A | 9/2001 | | JP | 2003-332820 A | 11/2003 |
| JP | 2001-256457 A | 9/2001 | | JP | 2004-040597 A | 2/2004 |
| JP | 2001-514777 A | 9/2001 | | JP | 2004-505481 A | 2/2004 |
| JP | 2001-319380 A | 11/2001 | | JP | 2004-082775 A | 3/2004 |
| JP | 2001-331976 A | 11/2001 | | JP | 2004-88218 A | 3/2004 |
| JP | 2001-332923 A | 11/2001 | | JP | 2004-096566 A | 3/2004 |
| JP | 2001-339226 A | 12/2001 | | JP | 2004-127230 A | 4/2004 |
| JP | 2001-344574 A | 12/2001 | | JP | 2004-519916 A | 7/2004 |
| JP | 2001-351084 A | 12/2001 | | JP | 2004-253858 A | 9/2004 |
| JP | 2001-352176 A | 12/2001 | | JP | 2004-527864 A | 9/2004 |
| JP | 2002-024776 A | 1/2002 | | JP | 2004-280390 A | 10/2004 |
| JP | 2002-026513 A | 1/2002 | | JP | 2004-287767 A | 10/2004 |
| JP | 2002-042076 A | 2/2002 | | JP | 2004-297249 A | 10/2004 |
| JP | 2002-063557 A | 2/2002 | | JP | 2004-297681 A | 10/2004 |
| JP | 2002-505645 A | 2/2002 | | JP | 2004-319848 A | 11/2004 |
| JP | 2002-076750 A | 3/2002 | | JP | 2004-326380 A | 11/2004 |
| JP | 2002-76750 A | 3/2002 | | JP | 2004-334268 A | 11/2004 |
| JP | 2002-150245 A | 5/2002 | | JP | 2004-336250 A | 11/2004 |
| JP | 2002-157564 A | 5/2002 | | JP | 2004-343000 A | 12/2004 |
| JP | 2002-158529 A | 5/2002 | | JP | 2004-362190 A | 12/2004 |
| JP | 2002-175508 A | 6/2002 | | JP | 2004-362341 A | 12/2004 |
| JP | 2002-183690 A | 6/2002 | | JP | 2004-362602 A | 12/2004 |
| JP | 2002-185358 A | 6/2002 | | JP | 2005-5866 A | 1/2005 |
| JP | 2002-204117 A | 7/2002 | | JP | 2005-18156 A | 1/2005 |
| JP | 2002-522849 A | 7/2002 | | JP | 2005-124061 A | 5/2005 |
| JP | 2002-230128 A | 8/2002 | | JP | 2005-129019 A | 5/2005 |
| JP | 2002-232221 A | 8/2002 | | JP | 2005-136528 A | 5/2005 |
| JP | 2002-252117 A | 9/2002 | | JP | 2005-137032 A | 5/2005 |
| JP | 2002-259934 A | 9/2002 | | JP | 3653099 B2 | 5/2005 |
| JP | 2002-280821 A | 9/2002 | | JP | 2005-165839 A | 6/2005 |
| JP | 2002-298109 A | 10/2002 | | JP | 2005-167327 A | 6/2005 |
| JP | 2002-308437 A | 10/2002 | | JP | 2005-167813 A | 6/2005 |
| JP | 2002-319008 A | 10/2002 | | JP | 2005-190417 A | 7/2005 |
| JP | 2002-319009 A | 10/2002 | | JP | 2005-191705 A | 7/2005 |
| JP | 2002-319812 A | 10/2002 | | JP | 2005-210676 A | 8/2005 |
| JP | 2002-362613 A | 12/2002 | | JP | 2005-210680 A | 8/2005 |
| JP | 2002-373029 A | 12/2002 | | JP | 2005-217822 A | 8/2005 |
| JP | 2002-373323 A | 12/2002 | | JP | 2005-236339 A | 9/2005 |
| JP | 2002-374139 A | 12/2002 | | JP | 2005-244778 A | 9/2005 |
| JP | 2003-006599 A | 1/2003 | | JP | 2005-275870 A | 10/2005 |
| JP | 2003-016412 A | 1/2003 | | JP | 2005-284352 A | 10/2005 |
| JP | 2003-026177 A | 1/2003 | | JP | 2005-293537 A | 10/2005 |
| JP | 2003-030612 A | 1/2003 | | JP | 2005-295135 A | 10/2005 |
| JP | 2003-44789 A | 2/2003 | | JP | 2005-311205 A | 11/2005 |
| JP | 2003-046318 A | 2/2003 | | JP | 2005-321305 A | 11/2005 |
| JP | 2003-58840 A | 2/2003 | | JP | 2005-335755 A | 12/2005 |
| JP | 2003-067711 A | 3/2003 | | JP | 2005-346820 A | 12/2005 |
| JP | 2003-069335 A | 3/2003 | | JP | 2005-352858 A | 12/2005 |
| JP | 2003-076947 A | 3/2003 | | JP | 2006-025390 A | 1/2006 |
| JP | 2003-78333 A | 3/2003 | | JP | 2006-031766 A | 2/2006 |

| | | | |
|---|---|---|---|
| JP | 2006-39902 A | 2/2006 |
| JP | 2006-42059 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2007-007888 A | 1/2007 |
| JP | 2007-043535 A | 2/2007 |
| JP | 2007-048126 A | 2/2007 |
| JP | 2007-65822 A | 3/2007 |
| JP | 2007-81712 A | 3/2007 |
| JP | 2007-096768 A | 4/2007 |
| JP | 2007-122542 A | 5/2007 |
| JP | 2007-150868 A | 6/2007 |
| JP | 2007-159083 A | 6/2007 |
| JP | 2007-159129 A | 6/2007 |
| JP | 4069958 B2 | 4/2008 |
| JP | 2008-160874 A | 7/2008 |
| JP | 11-175678 A | 1/2009 |
| NL | 9100176 A | 3/1992 |
| NL | 9100347 A | 3/1992 |
| WO | 99/67754 A1 | 12/1999 |
| WO | 00/10122 A2 | 2/2000 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2007/083574 A1 | 7/2007 |
| WO | 2007/083575 A1 | 7/2007 |
| WO | 2007/125683 A1 | 11/2007 |
| WO | 2007/138857 A1 | 12/2007 |
| WO | 2008/007606 A | 1/2008 |

OTHER PUBLICATIONS

Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frquency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
English translation of NL9100176, published on Mar. 2, 1992.
English translation of NL9100347, published on Mar. 2, 1992.

Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.

* cited by examiner

COMPOSITE ANTENNA

BACKGROUND OF THE INVENTION

1. Field of the Invention

The present invention relates to a composite antenna, and in particular, to a composite antenna that can be used for radio frequency identification (RFID) systems.

2. Description of the Related Art

RFID systems, for use as article management systems, have been developed in which non-contact communication and information transmission are performed between a reader/writer generating an induction field and an IC chip (also called an IC tag or a wireless tag) that stores predetermined information and is attached to an article or a container. The IC chip can communicate with a reader/writer by being connected to an antenna.

As a tag antenna for mounting an IC chip, the tag antenna disclosed in Japanese Unexamined Patent Application Publication No. 2006-295879 is known. This tag antenna includes an inductor and a dipole antenna. The dipole antenna has wide portions at both ends thereof, and the length of the dipole antenna is shorter than a half wavelength using the wavelength reduction effect of the wide portions. The inductor is connected to respective dipole antenna portions provided on both sides of a feeder. This inductor is used to adjust the impedance between the antenna and the IC tag arranged at the feeder.

Usually, a wireless tag exchanges information in relatively long distance communication. However, it is preferable in some cases to be able to perform short distance communication for particular information. When a plurality of wireless tags are arranged in proximity to a reader/writer, it is preferable that communication with the plurality of different wireless tags be established at the same time. However, the above-described tag antenna causes a problem in short distance communication, since a dipole antenna works better as a long distance electric field antenna. In addition, a dipole antenna has a problem in which a point at which an electric field becomes zero, i.e., a "null point" is generated in accordance with operating conditions such as a communication distance, leading to unstable communication.

SUMMARY OF THE INVENTION

To overcome the problems described above, preferred embodiments of the present invention provide a composite antenna achieving favorable radiation characteristics and communication performance that can be used for short distance communication as well as for long distance communication.

A composite antenna according to a preferred embodiment of the present invention includes a dipole antenna having an elongated shape, a loop antenna including at least one pair of opposing end portions, and a connection portion arranged to connect the dipole antenna and a point of the loop antenna at which an amplitude of a current flowing in the loop antenna has a maximum value.

In the composite antenna, the dipole antenna can perform long distance communication by utilizing an electric field, and the loop antenna can perform short distance communication by utilizing a magnetic field. In addition, since the loop antenna and the dipole antenna are connected at a point at which the amplitude of a current flowing in the loop antenna has a maximum value, the degree of coupling between the two antennas is high and the radiation characteristics and communication performance are improved.

The composite antenna according to various preferred embodiments of the present invention enables long distance communication using the dipole antenna and short distance communication using the loop antenna. In addition, the use of the two antennas stabilizes the communication performance and increases the coupling between the two antennas, thereby providing favorable radiation characteristics and communication performance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a composite antenna according to the present invention are described with reference to the attached drawings. Note that in each of the drawings, common elements are denoted by the same reference numerals and duplicate descriptions thereof are omitted.

First Preferred Embodiment

Figure 1A:
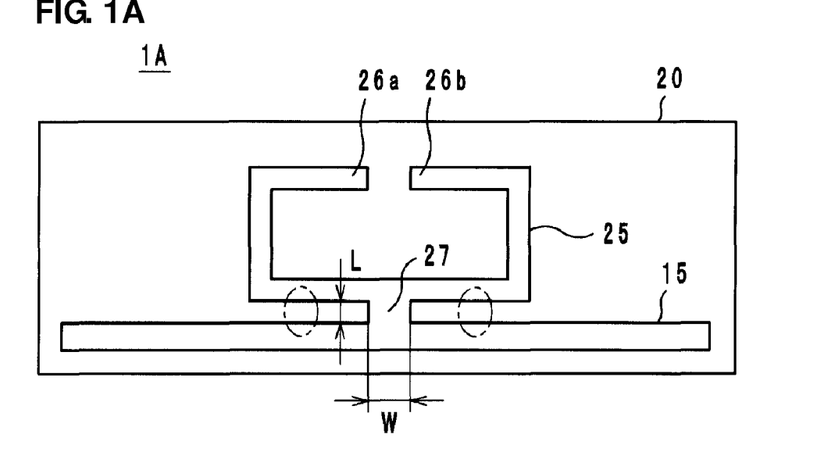
FIG. 1A is a plan view showing a composite antenna according to a first preferred embodiment of the present invention.

FIG. 1A shows a composite antenna 1A according to a first preferred embodiment of the present invention. The composite antenna 1A includes a long dipole antenna 15 and a loop antenna 25 provided on a substrate 20, such as a PET film, for example.

The dipole antenna 15 and the loop antenna 25 are preferably formed by bonding a thin metal plate preferably made of a conductive material, such as an aluminum or copper foil, for example, on the substrate 20 and performing patterning, or by applying conductive paste preferably of Al, Cu, or Ag, for example, on the substrate 20, or by patterning a film provided by plating with those metals, for example.

The loop antenna 25 includes a pair of end portions 26a and 26b facing each other, and a portion of the loop antenna 25 is electrically connected to the dipole antenna 15 via a connection portion 27. On the end portions 26a and 26b of the loop antenna 25, although not shown, a wireless IC chip, or a high frequency module having a wireless IC chip and having a feeder circuit (resonance circuit/matching circuit), is mounted, so as to define a wireless IC device that is capable of communicating with a reader/writer.

The wireless IC chip (not shown) connected to the loop antenna 25, which is well known, includes a clock circuit, a logic circuit, a memory circuit, and other suitable circuits, and processes a wireless signal of a predetermined frequency. A transmission signal having a predetermined frequency sent from this wireless IC chip is propagated to the dipole antenna 15 through the loop antenna 25 and radiated outward. A signal received by the dipole antenna 15 is provided to the wireless IC chip through the loop antenna 25.

The loop antenna 25 has a predetermined electrical length between the end portions 26a and 26b, and has a resonant frequency corresponding to the predetermined electrical length. The loop antenna 25 also functions as a matching unit to perform phase matching. Likewise, the dipole antenna 15 has a resonant frequency corresponding to the electrical length thereof. The loop antenna 25 provides impedance matching between the impedance of the wireless IC chip (usually about 50Ω) and the impedance (air impedance of about 377Ω) of the dipole antenna 15.

By denoting the resonant frequency of the loop antenna 25 as f1 and the resonant frequency of the dipole antenna 15 as f2, f1 is designed so as to be lower than f2. In other words, the loop antenna 25 and the dipole antenna 15 are respectively designed such that the electric length of the loop antenna 25 is equal or substantially equal to or greater than that of the dipole antenna 15 in a stand-alone state.

Further, the loop antenna 25 and the dipole antenna 15 are preferably electrically connected through the connection portion 27. More preferably, the connection portion 27 is located at a point at which a current flowing in the loop antenna 25 and a current flowing in the dipole antenna 15 are maximum currents. A point of maximum current means a point at which a current has a maximum amplitude. Since a magnetic field generated by a current has a maximum strength at the point of maximum current, the signal transmission has maximum efficiency. Consequently, the signal sent from the wireless IC propagates through the loop antenna 25 and is directly transmitted to the dipole antenna 15, and the coupling of both antennas is strengthened by selecting the position of the connection portion 27 to be at a point at which the currents of the two antennas are maximums, whereby signal transmission efficiency is increased. More specifically, the point of maximum current in the loop antenna 25 is an approximate center portion in the longitudinal direction, and the connection portion 27 is provided at the approximate center portion. The point of maximum current in the dipole antenna 15 is an approximate center portion in the longitudinal direction, and the connection portion 27 is provided at the approximate center portion.

From the loop antenna 25, a portion of the signal is radiated outward as a magnetic field, and from the dipole antenna 15, a portion of the signal is radiated outward as an electric field. Here, by designing the resonant frequency f1 of the loop antenna 25 so as to be lower than the resonant frequency f2 of the dipole antenna 15, a broader band is obtained in the radiation characteristics.

The dipole antenna 15 functions as an electric field antenna, and the loop antenna 25 functions as a magnetic field antenna. In other words, an electric field antenna is defined by a dipole antenna, and a magnetic field antenna is defined by a loop antenna. In a conventional electric field antenna, a null point, at which an electric field intensity becomes zero, appears due to, for example, an influence of the reflection of radio waves in accordance with a change in the operating conditions, such as a distance from a reader/writer, whereby the antenna may enter a state in which it does not function as an RFID. However, this null point is a point at which a magnetic field has a maximum strength. Thus, by using a magnetic field antenna, which receives the magnetic field, communication becomes possible. Thus, the use of both an electric field antenna and a magnetic field antenna enables a stable RFID operation. In addition, a magnetic antenna also enables short distance communication.

Figure 1B:
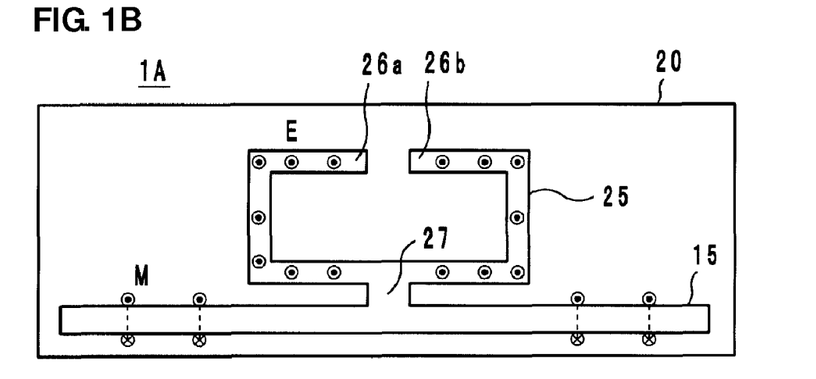
FIG. 1B is an illustration explaining how an electric field and a magnetic field are generated therein.

It is preferable that the dipole antenna 15 and the loop antenna 25 be arranged such that the electric field generated around the dipole antenna 15 and the magnetic field generated around the loop antenna 25 are perpendicular or substantially perpendicular to each other. FIG. 1B shows a state in which an electric field E is generated by the loop antenna 25 according to the first preferred embodiment in a direction perpendicular or substantially perpendicular to the paper plane of FIG. 1A, and a magnetic field M is generated in proximity to the dipole antenna 15 around an axis in the longitudinal direction of the dipole antenna 15. In the past, an electric antenna and a magnetic antenna have not been arranged in proximity to each other. The reason for this is that mutual interference exists therebetween, because the electric field and magnetic field cannot be arranged to be perpendicular or substantially perpendicular to each other, or a misalignment of the axes of the two antennas occurs. However, in the first preferred embodiment, a radial electric field is generated from the loop antenna 25 in the direction of the upper and lower surfaces, and along the upper and lower sides of the electrode of the loop antenna. The dipole antenna 15 radiates an electric field in the tangential direction of the magnetic field generated by the loop antenna 25, and thus, the magnetic field and electric field are perpendicular or substantially perpendicular to each other and are not coupled. Therefore, the dipole antenna 15 and the loop antenna 25 can be arranged in proximity to each other thereby providing a composite antenna having favorable radiation characteristics and communication performance.

Figure 3:
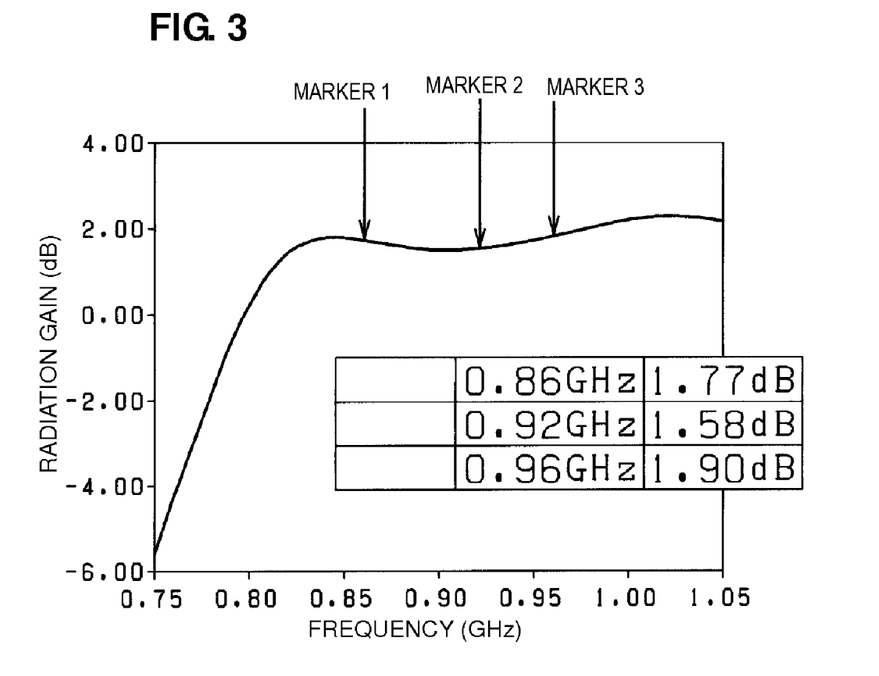
FIG. 3 is a graph showing the frequency characteristics of the radiation gain of the composite antenna according to the first preferred embodiment of the present invention.

FIG. 3 shows a radiation gain-frequency characteristic of the composite antenna 1A according to the first preferred embodiment. As shown in FIG. 3, a radiation gain of about 1.5 dB or greater is obtained over a wide frequency band of about 100 MHz, between the resonant frequency of the loop antenna 25 and the resonant frequency of the dipole antenna 15 in the state in which the loop antenna 25 and the dipole antenna 15 are coupled. Note that marker 1 and marker 2 respectively show the upper and lower limits of the frequencies used in the RFID in the UHF band.

Let f0 be the frequency of a signal sent or received by the composite antenna 1A. Then, by setting f0 so as to fall between the frequency f1' of marker 1 and the frequency f2' of marker 2, a sufficient radiation gain is obtained at the predetermined frequency f0. In addition, even when the frequencies f1' and f2' slightly fluctuate due to manufacturing variations of the loop antenna 25 and the dipole antenna 15, a wireless IC can operate without problems between the frequencies f1' and f2', which results in increased reliability.

Since the loop antenna 25 and the dipole antenna 15 are connected through the connection portion 27, the resonant frequency f2 of the dipole antenna 15 is lower than that set for the stand-alone antenna design due to the coupling of the loop antenna 25 and the dipole antenna 15. Thus, it is preferable that the resonant frequency f1 of the dipole antenna 15 in a stand-alone state be designed so as to be lower than the resonant frequency f2 of the dipole antenna 15. This enables the composite antenna 1A to have satisfactory radiation characteristics within a frequency band between the frequencies f1' and f2'. Note that the resonant frequency f2 of the dipole antenna 15 may preferably be lower than λ/2, where λ denotes the wavelength of a signal.

In the composite antenna 1A, as described above, the resonant frequency of a signal is set by the loop antenna 25. Thus, the composite antenna 1A, when attached to various articles, operates without modification, and variations in the radiation characteristics are prevented, whereby it is no longer necessary to perform design modifications for the dipole antenna 15 in accordance with individual articles. The frequency of a sent signal radiated from the dipole antenna 15 and the frequency of a received signal provided to a wireless IC substantially correspond to the resonant frequency of the loop antenna 25. Since the frequency of a sent/received signal is determined by the loop antenna 25, the frequency characteristics are not affected by the shape, size, or arrangement of the dipole antenna 15, and stable frequency characteristics are obtained even when, for example, the composite antenna 1A is rolled in or sandwiched between dielectric films.

Here, the degree of coupling between the loop antenna 25 and the dipole antenna 15 at the connection portion 27 will be explained. This degree of coupling is influenced by the width W and distance L (see FIG. 1) at the connection portion 27. The degree of coupling decreases when the width W and distance L increase. Three of the sides of the loop antenna 25 are in proximity to the dipole antenna 15, and secondary electromagnetic coupling is generated in this proximity area. This enables the coupling between the loop antenna 25 and the dipole antenna 15 to be further strengthened, which results in an increase in the radiation gain and further widening of the frequency band in the radiation characteristics.

Figure 2:
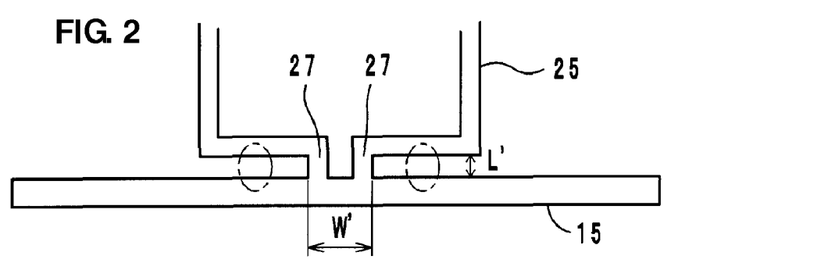
FIG. 2 is a plan view showing a modified example of the connection portion of the composite antenna according to the first preferred embodiment of the present invention.

The connection portion 27 may be branched at two locations as shown in FIG. 2. In this case, the degree of coupling increases as the width W' increases, and the degree of coupling decreases as the distance L' increases.

The loop antenna 25 may preferably have an oval shape or other various shapes, for example, and is not limited to a rectangular shape as in the first preferred embodiment. This is also the case with the other preferred embodiments described below.

Modification of the First Preferred Embodiment

Figure 4:
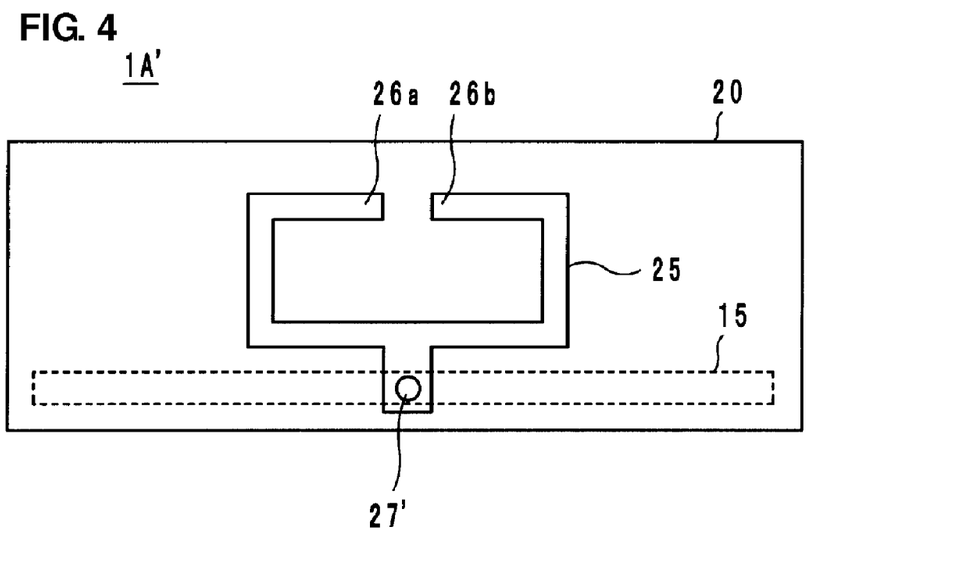
FIG. 4 is a plan view showing a modified example of the composite antenna according to the first preferred embodiment of the present invention.

In the composite antenna 1A of the first preferred embodiment described above, the dipole antenna 15, the loop antenna 25, and the connection portion 27 are provided on the same substrate 20. Consequently, the dipole antenna 15 and the loop antenna 25 can be easily formed using one process. However, a composite antenna 1A' shown in FIG. 4 may be provided. In the composite antenna 1A', the loop antenna 25 is disposed on the upper surface of the substrate 20 and the dipole antenna 15 is disposed on the lower surface of the substrate 20, and then the antennas 15 and 25 are connected by a via hole conductor 27' arranged so as to extend through the upper and lower surfaces of the substrate 20. Note that a composite antenna may also be configured as such a modified example also in the preferred embodiments described below.

Second Preferred Embodiment

Figure 5:
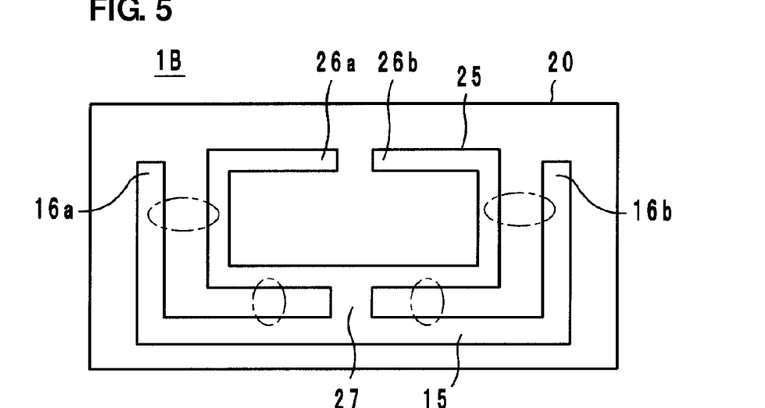
FIG. 5 is a plan view of a composite antenna according to a second preferred embodiment of the present invention.

FIG. 5 shows a composite antenna 1B according to a second preferred embodiment of the present invention. In the composite antenna 1B, end portions 16a and 16b of a dipole antenna 15 are bent along the sides of a loop antenna 25 and arranged such that the loop antenna 25 is sandwiched between the end portions 16a and 16b at both sides thereof in plan view. The other portions of the structure are similar to those of the first preferred embodiment described above, and their functions and effects are also similar to those of the first preferred embodiment described above.

In the second preferred embodiment, in particular, a reduction in size is achieved by bending the end portions 16a and 16b of the dipole antenna 15 toward the loop antenna 25. By making the end portions 16a and 16b of the dipole antenna 15 oriented in a predetermined direction, the directivity in a predetermined direction may be increased. Furthermore, since the bent portions including the end portions 16a and 16b are arranged in proximity to the loop antenna 25, secondary electromagnetic coupling is generated. This further strengthens the coupling between the loop antenna 25 and the dipole antenna 15, which results in an increase in the radiation gain and further widening of the frequency band in the radiation characteristics.

Third Preferred Embodiment

Figure 6:
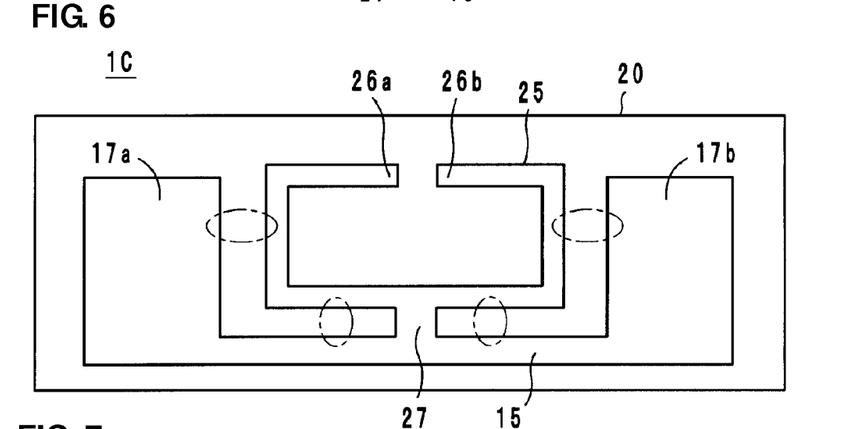
FIG. 6 is a plan view of a composite antenna according to a third preferred embodiment of the present invention.

FIG. 6 shows a composite antenna 1C according to a third preferred embodiment of the present invention. In the composite antenna 1C, the end potions include wide portions 17a and 17b. The other portions of the structure are similar to those of the first preferred embodiment described above, and their functions and effects are also similar to those of the first preferred embodiment described.

Fourth Preferred Embodiment

Figure 7:
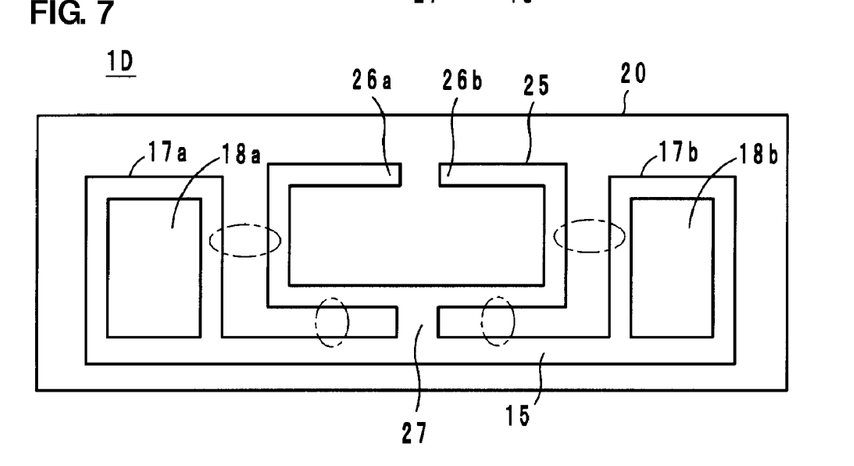
FIG. 7 is a plan view of a composite antenna according to a fourth preferred embodiment of the present invention.

FIG. 7 shows a composite antenna 1D according to a fourth preferred embodiment of the present invention. The composite antenna 1D includes holes 18a and 18b provided in the wide portions 17a and 17b of a dipole antenna 15. The other portions of the structure are similar to those of the first preferred embodiment described above, and their functions and effects are also similar to those of the first preferred embodiment described above. In the fourth preferred embodiment, in particular, by providing the holes 18a and 18b in the wide portions 17a and 17b, the resonant frequency of the dipole antenna 15 can be reduced. This enables the total length of the dipole antenna 15 to be decreased thereby reducing the size thereof while improving the radiation characteristics and communication performance.

Fifth Preferred Embodiment

Figure 8:
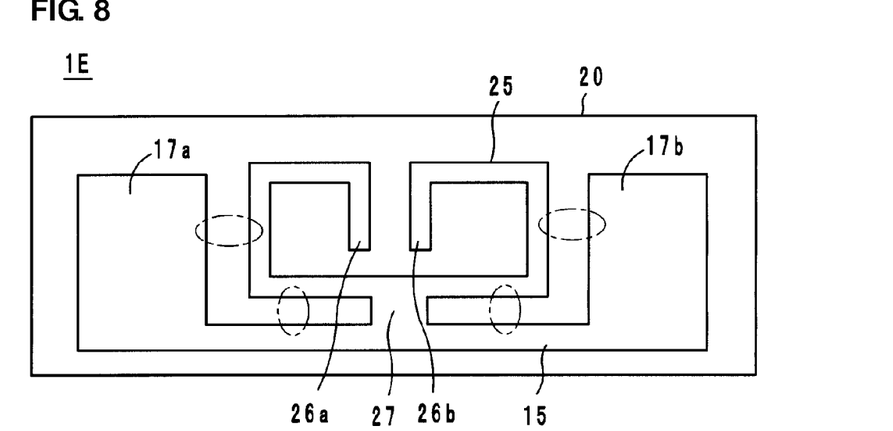
FIG. 8 is a plan view of a composite antenna according to a fifth preferred embodiment of the present invention.

FIG. 8 shows a composite antenna 1E according to a fifth preferred embodiment of the present invention. In the composite antenna 1E, end portions 26a and 26b of a loop antenna 25 are bent toward the inside of the loop antenna 25. The other portions of the structure are similar to those of the first preferred embodiment described above, and their functions and effects are also similar to those of the first preferred embodiment described above. In the fifth preferred embodiment, in particular, bending the end portions 26a and 26b toward the inside of the loop antenna 25 generates a capacitance between the bent portions, including the end portions 26a and 26b, and the neighboring line portions of the loop antenna 25. Based on the capacitance and the length of the loop antenna 25, the resonant frequency of the loop antenna 25 can be effectively set. This enables a decrease in the total length of the loop antenna and, accordingly, a reduction in size. The design freedom of the loop antenna 25 is also increased.

Sixth Preferred Embodiment

Figure 9:
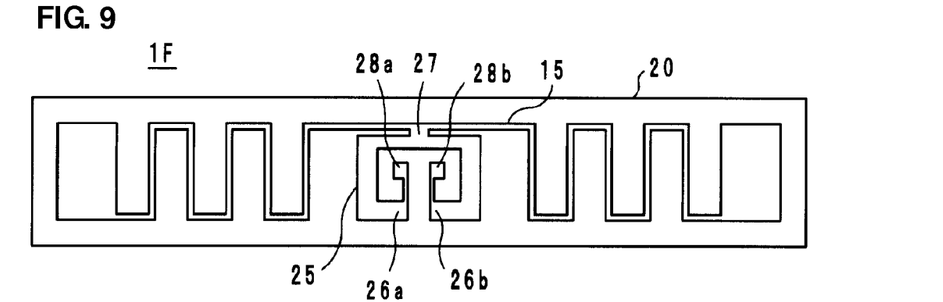
FIG. 9 is a plan view of a composite antenna according to a sixth preferred embodiment of the present invention.

FIG. 9 shows a composite antenna 1F according to a sixth preferred embodiment of the present invention. In the composite antenna 1F, the center portion of a dipole antenna 15 arranged in a meandering shape is connected (at a connection portion 27) to the maximum current point of a loop antenna 25. The loop antenna 25 is provided with a pair of opposing end portions 26a and 26b and IC lands 28a and 28b for mounting a wireless IC.

In the sixth preferred embodiment, the loop antenna 25 and the dipole antenna 15 are coupled and function as a composite antenna similarly to the first preferred embodiment. In the sixth preferred embodiment, in particular, a large electric length having a small area is provided by arranging the dipole antenna 15 to have a meandering shape.

Seventh Preferred Embodiment

Figure 10:
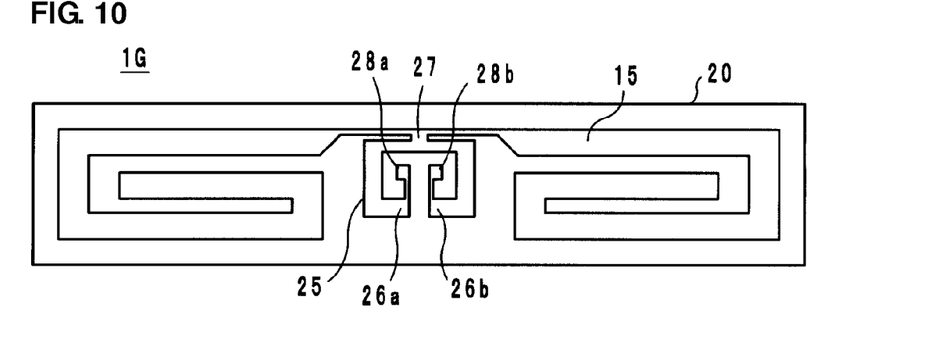
FIG. 10 is a plan view of a composite antenna according to a seventh preferred embodiment of the present invention.

FIG. 10 shows a composite antenna 1G according to a seventh preferred embodiment of the present invention. In the composite antenna 1G, the approximate center portion of a dipole antenna 15 arranged in a spiral shape is connected (at a connection portion 27) to the maximum current point of a loop antenna 25. The loop antenna 25 is provided with a pair of opposing end portions 26a and 26b and IC lands 28a and 28b for mounting a wireless IC.

In the seventh preferred embodiment, the loop antenna 25 and the dipole antenna 15 are coupled and function as a composite antenna similarly to the first preferred embodiment. In the seventh preferred embodiment, in particular, a large electric length having a small area is provided by arranging the dipole antenna 15 to have a spiral shape.

Eighth Preferred Embodiment

Figure 11:
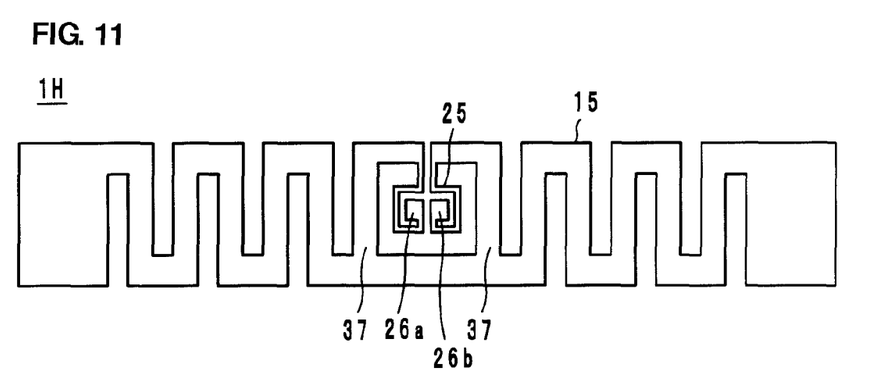
FIG. 11 is a plan view of a composite antenna according to an eighth preferred embodiment of the present invention.

FIG. 11 shows a composite antenna 1H according to an eighth preferred embodiment of the present invention. In the composite antenna 1H, a portion near the approximate center portion of a dipole antenna 15 arranged in a meandering shape is connected at two points (connection portions 37) to a loop antenna 25. The loop antenna 25 is provided with a pair of opposing end portions 26a and 26b, which are used for mounting a wireless IC.

In the eighth preferred embodiment, the loop antenna 25 and the dipole antenna 15 are coupled and function as a composite antenna similarly to the first preferred embodiment. In the eighth preferred embodiment, in particular, the degree of coupling can be adjusted by connecting the loop antenna 25 to the dipole antenna 15 at two points.

A composite antenna according to the present invention is not limited to the preferred embodiments described above, and various modifications can be made within the scope of the invention.

For example, the materials of radiation plates and substrates of the preferred embodiments described above are merely examples, and any suitable material which has the required characteristics may be used. The loop antennas and dipole antennas shown in the preferred embodiments described above are configured to have bilaterally symmetric structures. However, loop antennas may be connected to respective dipole antennas at different positions in a bilaterally non-symmetric manner.

As described above, preferred embodiments of the present invention are useful for composite antennas, and in particular, have an advantage that it can be used not only for long distance communication but also for short distance communication and provides favorable radiation characteristics and communication performance.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A composite antenna, comprising:
   a dipole antenna having an elongated shape;
   a loop antenna including at least one pair of opposing end portions; and
   a connection portion arranged to connect the dipole antenna and a point of the loop antenna at which an amplitude of a current flowing in the loop antenna has a maximum value; wherein
   an electrical length of the loop antenna in a stand-alone state is greater than an electrical length of the dipole antenna in a stand-alone state.

2. The composite antenna according to claim 1, wherein the connection portion is connected to a point of the dipole antenna at which an amplitude of a current flowing in the dipole antenna has a maximum value.

3. The composite antenna according to claim 1, wherein the dipole antenna and the loop antenna are arranged such that an electric field generated around the dipole antenna and a magnetic field generated around the loop antenna are perpendicular or substantially perpendicular to each other.

4. The composite antenna according to claim 1, wherein end portions of the dipole antenna are arranged such that the loop antenna is disposed between the end portions of the dipole antenna at both sides of the loop antenna in plan view.

5. The composite antenna according to claim 1, wherein the dipole antenna and the loop antenna are electrically connected at respective approximate center portions thereof in respective longitudinal directions.

6. The composite antenna according to claim 1, wherein a resonant frequency of the loop antenna in the stand-alone state is higher than a resonant frequency of the dipole antenna in the stand-alone state.

7. The composite antenna according to claim 1, wherein the loop antenna has a substantially rectangular shape.

8. The composite antenna according to claim 7, wherein the loop antenna is electromagnetic coupled with the dipole antenna at three sides of the substantially rectangular shape.

9. The composite antenna according to claim 1, wherein both ends of the dipole antenna are provided with wide portions that are wider than a line width of the approximate center portion of the dipole antenna in the longitudinal direction.

10. The composite antenna according to claim 1, wherein the pair of end portions of the loop antenna are arranged so as to be located toward the inside of the loop antenna.

11. The composite antenna according to claim 1, wherein a plurality of the connection portions are provided.

12. The composite antenna according to claim 1, wherein the loop antenna, the dipole antenna, and the connection portion are provided on a single common substrate.

13. The composite antenna according to claim 1, wherein the loop antenna is provided on a first main surface of a substrate and the dipole antenna is provided on a second main surface of the substrate opposite to the first main surface, and the loop antenna and the dipole antenna are connected by a via hole conductor provided in the substrate.

* * * * *